United States Patent
Hokoi

(10) Patent No.: US 8,506,448 B2
(45) Date of Patent: Aug. 13, 2013

(54) HYBRID VEHICLE

(71) Applicant: Koji Hokoi, Toyota (JP)

(72) Inventor: Koji Hokoi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/666,135

(22) Filed: Nov. 1, 2012

(65) Prior Publication Data

US 2013/0116078 A1    May 9, 2013

(30) Foreign Application Priority Data

Nov. 7, 2011    (JP) .................................. 2011-243555

(51) Int. Cl.
*B60K 1/02* (2006.01)

(52) U.S. Cl.
USPC ............................................................. 477/3

(58) Field of Classification Search
USPC ................. 475/5, 151, 903; 310/68 R, 68 D; 180/65.8
See application file for complete search history.

(56) References Cited

U.S. PATENT DOCUMENTS

| | | | |
|---|---|---|---|
| 7,099,756 B2 * | 8/2006 | Sato | 701/22 |
| 7,212,841 B2 * | 5/2007 | Shahaf et | 455/570 |
| 7,398,844 B2 * | 7/2008 | Ishikawa et al. | 180/65.285 |
| 2003/0042809 A1 * | 3/2003 | Taniguchi et al. | 310/68 R |
| 2006/0152095 A1 * | 7/2006 | Kikuchi et al. | 310/68 R |
| 2007/0249461 A1 * | 10/2007 | Tsuji et al. | 477/3 |
| 2010/0071971 A1 * | 3/2010 | Tatematsu et al. | 180/65.8 |
| 2010/0292881 A1 | 11/2010 | Takahashi | |

FOREIGN PATENT DOCUMENTS

| | | |
|---|---|---|
| JP | 2008-265652 A | 11/2008 |
| JP | 2009-126272 A | 6/2009 |
| JP | 2009-280033 A | 12/2009 |
| JP | 2010-068689 A | 3/2010 |
| JP | 2010-264852 A | 11/2010 |

* cited by examiner

*Primary Examiner* — David D Le
*Assistant Examiner* — David J Hlavka
(74) *Attorney, Agent, or Firm* — Gifford, Krass, Sprinkle, Anderson & Citkowski, P.C.

(57) ABSTRACT

A power split mechanism of a hybrid vehicle includes a sun gear that is coupled to a electric power generator, a ring gear that is coupled to a electric motor and a driving wheel, a pinion gear that meshes with the sun gear and the ring gear, and a carrier that supports the pinion gear and is coupled to a engine. Each of the arms of a inverter includes a first switching element that is provided on an upper arm thereof, and a second switching element that is provided on a lower arm thereof. A control device turns on one of the first switching element and the second switching element and turns off the other if an operation of stopping a vehicle system is performed during running.

7 Claims, 11 Drawing Sheets

HYBRID VEHICLE

INCORPORATION BY REFERENCE

The disclosure of Japanese Patent Application No. 2011-243555 filed on Nov. 7, 2011 including the specification, drawings and abstract is incorporated herein by reference in its entirety.

BACKGROUND OF THE INVENTION

1. Field of the Invention

The invention relates to a hybrid vehicle that is equipped with an engine and an electric motor.

2. Description of the Related Art

There is known a hybrid vehicle that is equipped with an engine and a motor (an electric motor) for driving driving wheels, a generator (an electric power generator) capable of generating an electric power by a power of the engine, and a power split mechanism that splits the power of the engine and transmits the split power to the driving wheels and the generator.

The power split mechanism of this hybrid vehicle includes a sun gear that is coupled to the generator, a ring gear that is coupled to the motor and the driving wheels, a pinion gear that meshes with the sun gear and the ring gear, and a carrier that supports the pinion gear and is coupled to the engine.

In this hybrid vehicle, the power of the engine is transmitted to the generator via the carrier and the sun gear, and an electric power is thereby generated by the generator. Besides, the power of the engine is transmitted to the driving wheels via the carrier and the ring gear, and the driving wheels are thereby driven. Furthermore, the output of the engine can be supplemented (assisted) by outputting the power of the motor to the ring gear.

Besides, this hybrid vehicle is provided with a power switch for allowing a driver to boot and stop a hybrid system (a vehicle system).

It should be noted herein that the aforementioned hybrid vehicle includes a hybrid vehicle that is configured to make a transition to a limp mode in which the vehicle runs only by the power of the motor, by stopping the operation of the generator and the operation of the engine if an abnormality occurs in the generator.

However, in this hybrid vehicle, if the operation of the engine is stopped while running at high speed, the carrier is stopped from rotating, so that the difference between the rotational speed of the ring gear and the rotational speed of the carrier increases. In some cases, therefore, over-rotation of the pinion gear occurs.

Thus, in Japanese Patent Application Publication No. 2010-264852 (JP-2010-264852 A), there is proposed a hybrid vehicle in which the operation of an engine is controlled so as to prevent over-rotation of a pinion gear in making a transition to a limp mode.

In the conventional hybrid vehicle disclosed in Japanese Patent Application Publication No. 2010-264852 (JP-2010-264852 A), over-rotation of the pinion gear is prevented by continuing the operation of the engine. However, if the operation of the engine is stopped through the performance of an operation of stopping the hybrid system during running, over-rotation of the pinion gear may occur.

SUMMARY OF THE INVENTION

The invention provides a hybrid vehicle capable of suppressing the occurrence of over-rotation of a pinion gear if an operation of stopping a vehicle system is performed during running.

A hybrid vehicle in accordance with an aspect of the invention is equipped with an engine and an electric motor for driving a driving wheel, an electric power generator capable of generating an electric power by a power of the engine, a power split mechanism that splits the power of the engine and transmits the split power to the driving wheel and the electric power generator, an inverter that is connected to the electric power generator and includes a plurality of aims, and a control device that controls running through execution of a vehicle system. In addition, the power split mechanism includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine. Each of the arms of the inverter includes a first switching element that is provided on an upper arm thereof, and a second switching element that is provided on a lower arm thereof. The control device is configured to turn on one of the first switching element and the second switching element and turn off the other if an operation of stopping the vehicle system is performed during running.

With the above configuration, if the operation of stopping the vehicle system is performed during running and the operation of the engine is stopped, the back electromotive force generated by the electric power generator can be refluxed on the upper arm or the lower arm due to the rotation of the sun gear in accordance with the rotation of the engine (the carrier) by inertia. Therefore, a torque applied in such a direction as to maintain the rotation of the carrier (the engine) (a torque that raises the rotational speed of the engine) can be output from the electric power generator. Thus, the difference between the rotational speed of the ring gear and the rotational speed of the carrier can be restrained from increasing. Therefore, the occurrence of over-rotation of the pinion gear can be suppressed.

In the hybrid vehicle in accordance with the foregoing aspect of the invention, the control device may have an over-rotation determination flag for determining whether or not over-rotation of the pinion gear occurs, and may be configured to turn on one of the first switching element and the second switching element and turn off the other if the over-rotation determination flag is on.

With this configuration, the torque applied in such a direction as to maintain the rotation of the carrier is output from the electric power generator if over-rotation of the pinion gear may occur. Thus, the occurrence of over-rotation of the pinion gear can be suppressed.

In the hybrid vehicle in accordance with the foregoing aspect of the invention in which the aforementioned control device has the over-rotation determination flag, the control device may have a resonance band residence determination flag for determining whether or not a rotational speed of the engine resides in a resonance band, and may be configured to turn on one of the first switching element and the second switching element and turn off the other if the over-rotation determination flag is on and the resonance band residence determination flag is off.

With this configuration, if the rotational speed of the engine does not reside in the resonance band, a torque applied in such a direction as to maintain the rotation of the carrier is output from the electric power generator, and if the rotational speed of the engine resides in the resonance band, a torque is prevented from being output from the electric power generator. Thus, the rotational speed of the engine is made likely to leave the resonance band.

In the hybrid vehicle in accordance with the foregoing aspect of the invention in which the aforementioned control device has the resonance band residence determination flag, the hybrid vehicle may be equipped with an electric storage device that stores an electric power for running. The control device may have a charge prohibition flag indicating whether or not the electric storage device is prohibited from being charged, and may be configured to turn on one of the first switching element and the second switching element and turn off the other if the over-rotation determination flag is on, the resonance band residence determination flag is off, and the charge prohibition flag is on.

With this configuration, a back electromotive force is refluxed in the case where the electric storage device is prohibited from being charged. Thus, a torque applied in such a direction as to maintain the rotation of the carrier can be output from the electric power generator without charging the electric storage device.

In the hybrid vehicle in accordance with the foregoing aspect of the invention in which the aforementioned control device has the charge prohibition flag, the hybrid vehicle may be equipped with a step-up/step-down converter that is provided between the inverter and the electric storage device. Each of the arms of the inverter may include a first rectifying element that is provided in parallel with the first switching element, and a second rectifying element that is provided in parallel with the second switching element. The control device may be configured to turn off the first switching element and the second switching element and control the step-up/step-down converter in such a manner as to charge the electric storage device by generating an electric power by the electric power generator if the over-rotation determination flag is on, the resonance band residence determination flag is off, and the charge prohibition flag is off.

With this configuration, if the electric storage device is allowed to be charged, a torque applied in such a direction as to maintain the rotation of the carrier can be output from the electric power generator while rectifying the back electromotive force to charge the electric storage device.

According to the foregoing aspect of the invention, if the operation of stopping the vehicle system is performed during running, the occurrence of over-rotation of the pinion gear can be suppressed.

In a second aspect of the invention, a control method for a hybrid vehicle that is equipped with an engine and an electric motor for driving a driving wheel, an electric power generator capable of generating an electric power by a power of the engine, a power split mechanism that splits the power of the engine and transmits the split power to the driving wheel and the electric power generator, and includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine, and an inverter that is connected to the electric power generator and includes a plurality of arms each of which includes a first switching element provided on an upper arm thereof and a second switching element provided on a lower arm thereof, the method may includes turning on one of the first switching element and the second switching element and turning off the other if an operation of stopping a vehicle system is performed during running and the sun gear is in a negative rotation range.

In a third aspect of the invention, a control method for a hybrid vehicle that is equipped with an engine and an electric motor for driving a driving wheel, an electric power generator capable of generating an electric power by a power of the engine, a power split mechanism that splits the power of the engine and transmits the split power to the driving wheel and the electric power generator, and includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine, and an inverter that is connected to the electric power generator and includes a plurality of arms each of which includes a first switching element provided on an upper arm thereof and a second switching element provided on a lower arm thereof, each of the arms including a first rectifying element that is provided in parallel with the first switching element, and a second rectifying element that is provided in parallel with the second switching element, an electric storage device that stores an electric power for running, and a step-up/step-down converter that is provided between the inverter and the electric storage device, the method may includes turning off the first switching element and the second switching element and controlling the step-up/step-down converter in such a manner as to charge the electric storage device by generating an electric power by the electric power generator if an operation of stopping a vehicle system is performed during running and the sun gear is in a negative rotation range.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
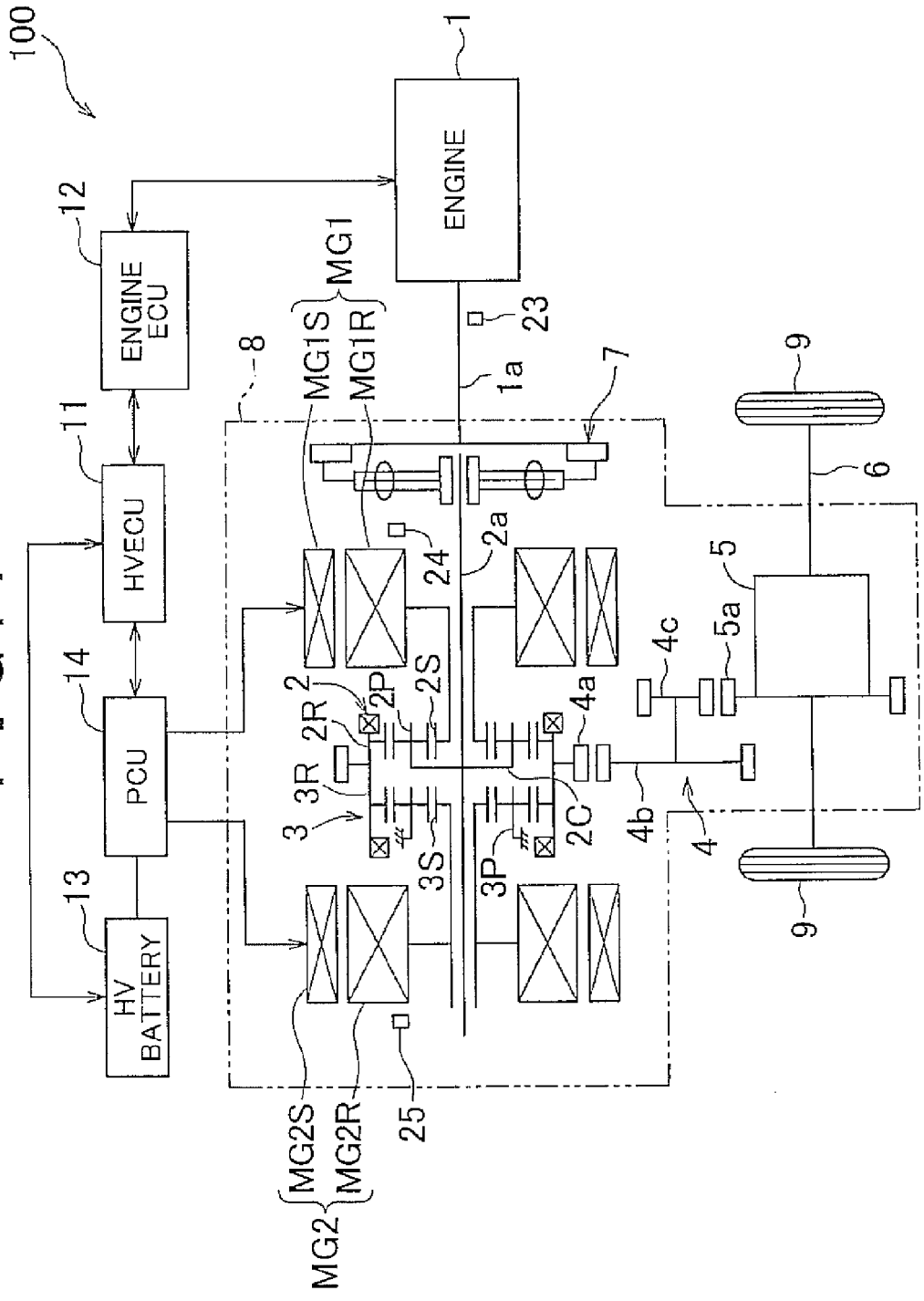
FIG. 1 is a diagram showing an overall configuration of a hybrid vehicle in accordance with one embodiment of the invention.

The embodiments of the invention will be described hereinafter on the basis of the drawings.

—Mechanical Configuration—

First of all, a mechanical configuration (a drive mechanism) of a hybrid vehicle 100 in accordance with one embodiment of the invention will be described with reference to FIGS. 1 and 2.

The hybrid vehicle 100 is of, for example, a front-engine front-drive (FF) type, and front-right and front-left wheels (driving wheels) 9 of the hybrid vehicle 100 are driven. As shown in FIG. 1, this hybrid vehicle 100 is equipped with an engine (an internal combustion engine) 1, a generator MG1, a motor MG2, a power split mechanism 2, a reduction mechanism 3, a speed reducer 4, a differential device 5, and a drive shaft 6.

The engine 1 is a known power unit that outputs a power by causing fuel for gasoline engines, diesel engines or the like to burn. The engine 1 is configured such that an operation state thereof, for example, a throttle opening degree (an intake air amount) of a throttle valve provided in an intake passage, a fuel injection amount, an ignition timing or the like can be controlled.

An output of the engine 1 is transmitted to an input shaft 2a of the power split mechanism 2 via a crankshaft 1a and a damper 7. The damper 7 is, for example, a coil spring-type transaxle damper, and absorbs fluctuations in the torque of the engine 1.

The generator MG1 mainly functions as an electric power generator, and also functions as an electric motor depending on circumstances. The generator MG1 is realized as, for example, an alternating-current synchronous electric power generator. The generator MG1 has a rotor MG1R that is made of a permanent magnet rotatably supported on the input shaft 2a, and a stator MG1S around which a three-phase winding is wound. Incidentally, the generator MG1 is an example of "the electric power generator" of the invention.

The motor MG2 mainly functions as an electric motor, and also functions as an electric power generator depending on circumstances. The motor MG2 is realized as, for example, an alternating-current synchronous electric motor. The motor MG2 has a rotor MG2R that is made of a permanent magnet, and a stator MG2S around which a three-phase winding is wound. Incidentally, the motor MG2 is an example of "the electric motor" of the invention.

The power split mechanism 2 is a mechanism that splits an output of the engine 1 into a power for driving the front-right and front-left wheels 9 and a power for driving the generator MG1 for the sake of electric power generation. The power split mechanism 2 is realized as, for example, a planetary gear mechanism.

More specifically, the power split mechanism 2 has a sun gear 2S as an external gear that revolves on its own axis at a center among a plurality of gear elements, a pinion gear 2P as an external gear that revolves on its own axis and around the sun gear 2S while being circumscribed to (meshing with) the sun gear 2S, a ring gear 2R as an internal gear that is formed in the shape of a ring so as to mesh with the pinion gear 2P, and a planetary carrier 2C that supports the pinion gear 2P and revolves on its own axis through the revolution of this pinion gear 2P.

The planetary carrier 2C is integrally rotatably coupled to the input shaft 2a on the engine 1 side. The sun gear 2S is integrally rotatably coupled to the rotor MG1R of the generator MG1.

Besides, a counter drive gear 4a is integrally provided on an outer peripheral portion of the ring gear 2R. This counter drive gear 4a meshes with a counter driven gear 4b. The counter driven gear 4b is integrally provided with a final drive gear 4c. The final drive gear 4c meshes with a differential driven gear 5a of the differential device 5. Incidentally, the counter drive gear 4a, the counter driven gear 4b, the final drive gear 4c, the differential driven gear 5a, and the like constitute the speed reducer 4.

Due to the provision of this power split mechanism 2, a power output from the engine 1 is split into a power that is transmitted from the planetary carrier 2C to the sun gear 2S, and a power that is transmitted from the planetary carrier 2C to the ring gear 2R.

Out of these powers obtained through splitting, the power transmitted to the sun gear 2S is transmitted to the rotor MG1R of the generator MG1. The rotor MG1R is driven by the power, so that an electric power is generated by the generator MG1. Incidentally, when the engine 1 is started, the generator MG1 is driven through an electric power supplied from the HV battery 13, so that the engine 1 is cranked. That is, the generator MG1 also functions as a starter motor when the engine 1 is started.

On the other hand, the power transmitted from the engine 1 to the ring gear 2R is synthesized with the power output by the motor MG2. This synthetic power is transmitted from the ring gear 2R (the counter drive gear 4a) to the front wheels 9 via the speed reducer 4, the differential device 5, and the drive shaft 6. The front wheels 9 are driven by the power thus transmitted.

Figure 2:
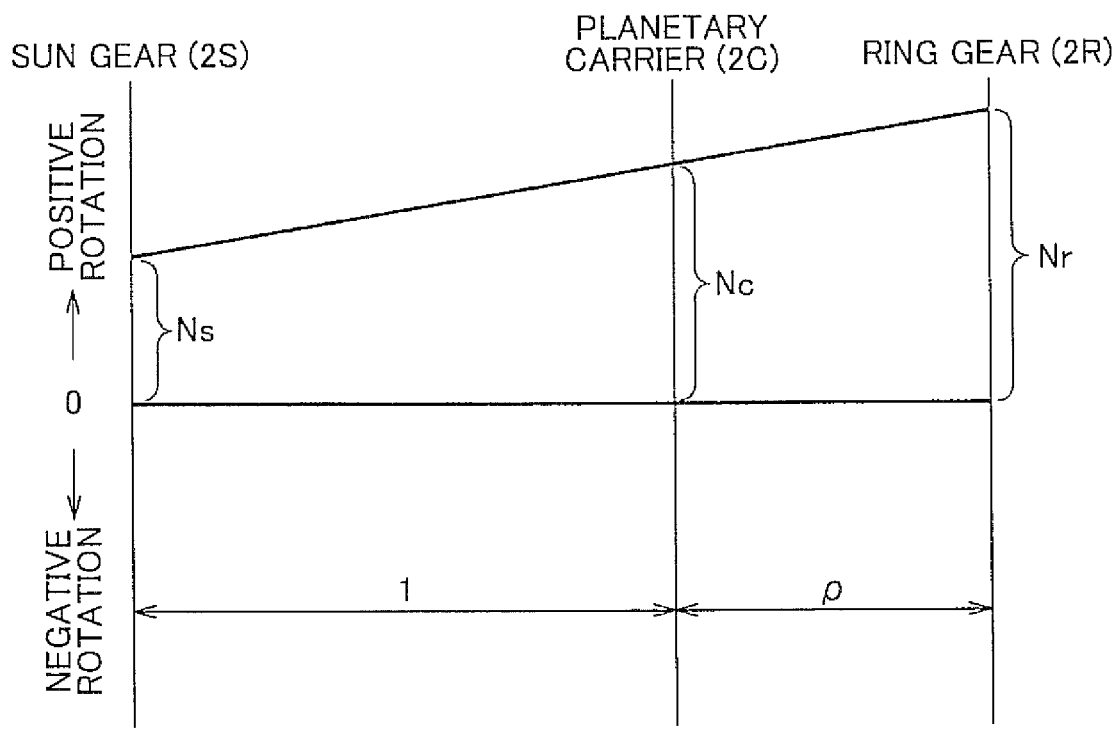
FIG. 2 is a collinear diagram showing an example of a running state in order to illustrate a power split mechanism of the hybrid vehicle of FIG. 1.

It should be noted herein that FIG. 2 shows a collinear diagram that represents a relationship among the sun gear 2S, the planetary carrier 2C, and the ring gear 2R of the power split mechanism 2. Incidentally, FIG. 2 shows an example at the time of the running of the hybrid vehicle 100.

Three axes of ordinate of this collinear diagram represent rotational speeds of the sun gear 2S, the planetary carrier 2C, and the ring gear 2R in this order from the left-hand side. That is, Ns denotes a rotational speed of the sun gear 2S, Nc denotes a rotational speed of the planetary carrier 2C, and Nr denotes a rotational speed of the ring gear 2R.

In addition, the axis representing the rotational speed of the planetary carrier 2C is arranged at a position obtained by internally dividing a line segment between the axis representing the rotational speed of the sun gear 2S and the axis representing the rotational speed of the ring gear 2R at a ratio of 1:$\rho$. Incidentally, $\rho$ is expressed by an equation shown below in which TNs denotes the number of teeth of the sun gear 2S, and TNr denotes the number of teeth of the ring gear 2R.

$$\rho = TNs/TNr$$

Besides, there is established a relationship shown below in which Ng denotes a rotational speed of the generator MG1, Ne denotes a rotational speed of the engine 1, Nm denotes a rotational speed of the motor MG2, and k denotes a speed reduction ratio of the later-described reduction mechanism 3.

$$Ns = NgNc = NeNr = k \times Nm$$

In addition, on the collinear diagram of the power split mechanism 2, a straight line is obtained by linking the rotational speed Ns of the sun gear 2S, the rotational speed Nc of the planetary carrier 2C, and the rotational speed Nr of the ring gear 2R. That is, if any two of the rotational speed Ns of the sun gear 2S, the rotational speed Nc of the planetary carrier 2C, and the rotational speed Nr of the ring gear 2R are determined, the other rotational speed is determined. More specifically, there is established a relationship shown below.

$$Nc = \{\rho/(1+\rho)\} \times Ns + \{1/(1+\rho)\} \times Nr$$

The reduction mechanism 3 is a mechanism that reduces the rotational speed of the motor MG2 to amplify the drive torque. The reduction mechanism 3 is realized as, for example, a planetary gear mechanism.

More specifically, as shown in FIG. 1, the reduction gear 3 has a sun gear 3S as an external gear that revolves on its own axis at a center among a plurality of gear elements, a pinion gear 3P as an external gear that revolves on its own axis while being circumscribed to the sun gear 3S, and a ring gear 3R as an internal gear that is formed in the shape of a ring so as to mesh with the pinion gear 3P.

The ring gear 3R of the reduction mechanism 3, the ring gear 2R of the power split mechanism 2, and the counter drive gear 4a are integrated with one another. Besides, the sun gear 3S is integrally rotatably coupled to the rotor MG2R of the motor MG2.

Due to the provision of this reduction mechanism 3, the output (the power) of the motor MG2 is synthesized with the power transmitted from the engine 1 to the ring gear 2R of the power split mechanism 2 when this motor MG2 is driven. Thus, the output of the engine 1 can be supplemented (assisted), and the driving forces of the front wheels 9 can be enhanced. Incidentally, while running at low speed and with light load etc., the vehicle can be caused to run only by the power of the motor MG2 with the engine 1 stopped (EV running). Besides, at the time of regenerative braking, the motor MG2 converts kinetic energy into electric energy, thus making it possible to generate an electric power.

Incidentally, the generator MG1, the motor MG2, the power split mechanism 2, the reduction mechanism 3, the speed reducer 4, the differential device 5, the damper 7, and the like constitute a transaxle 8. The engine 1 is coupled to this transaxle 8 via the crankshaft 1a. Also, the front wheels 9 are coupled to the transaxle 8 via the drive shaft 6.

—Electric Configuration—

Next, an electric configuration (an electric system) of the hybrid vehicle 100 in accordance with one embodiment of the invention will be described with reference to FIGS. 1 to 6.

As shown in FIG. 1, the hybrid vehicle 100 is equipped with an HVECU 11, an engine ECU 12, an HV battery 13, and a power control unit (a PCU) 14.

[HVECU]

The HVECU 11 is configured to comprehensively control the hybrid vehicle 100. For example, the HVECU 11 executes a hybrid system (a vehicle system) to control the running of the hybrid vehicle 100. Incidentally, the HVECU 11 is an example of "the control device" of the invention.

It should be noted herein that the hybrid system is a system that controls the running of the hybrid vehicle 100 by performing various kinds of control including operation control for the engine 1, drive control for the generator MG1 and the motor MG2, cooperative control for the engine 1, the generator MG1, and the motor MG2, and the like.

Figure 6:
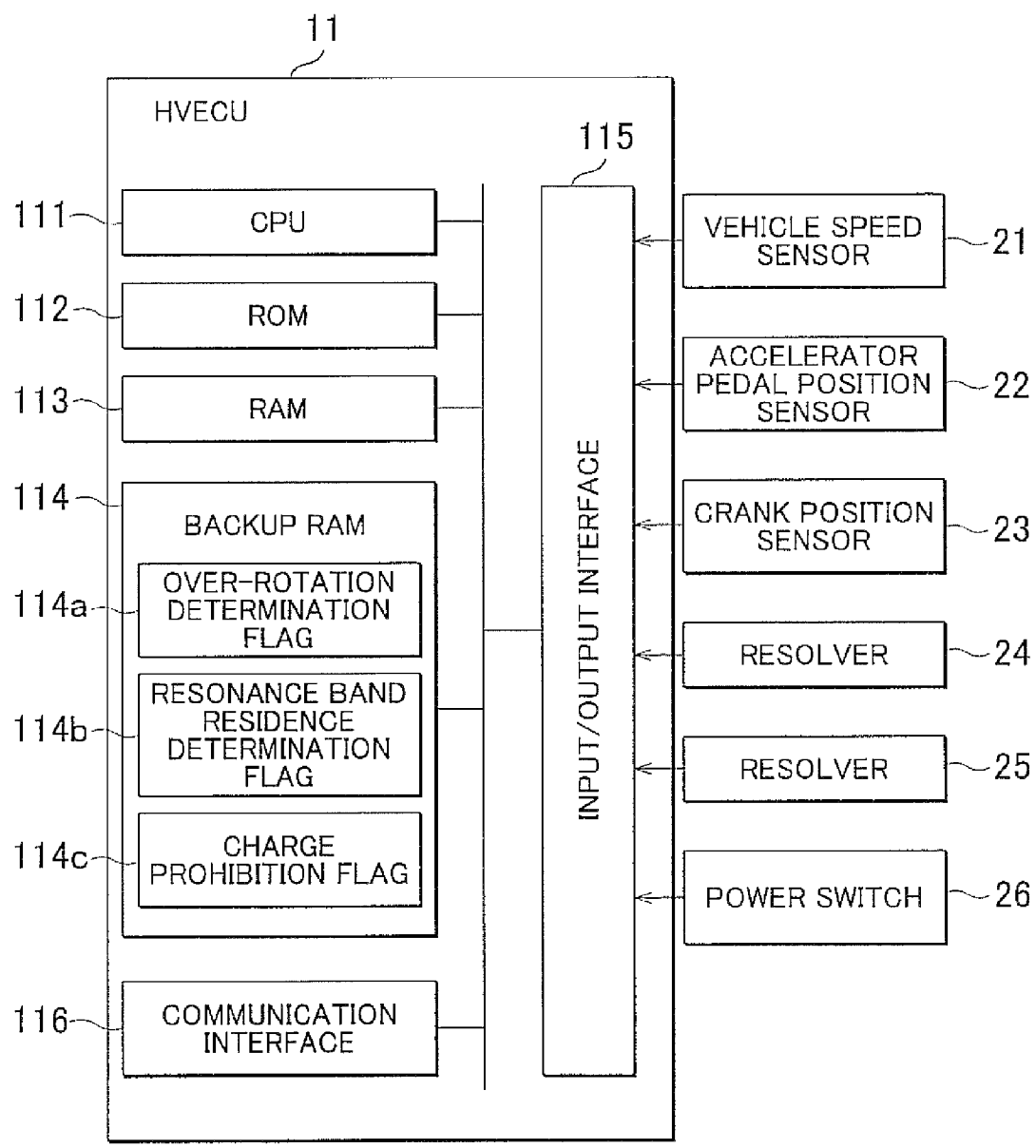
FIG. 6 is a block diagram showing an HVECU of the hybrid vehicle of FIG. 1.

As shown in FIG. 6, this HVECU 11 includes a central processing unit (a CPU) Ill, a read only memory (a ROM) 112, a random access memory (a RAM) 113, a backup RAM 114, an input/output interface 115, and a communication interface 116.

The CPU 111 performs a calculation processing on the basis of various control programs and maps stored in the ROM 112. The various control programs, the maps that are referred to in executing those various control programs, and the like are stored in the ROM 112. The RAM 113 is a memory that temporarily stores a calculation result obtained from the CPU 111, detection results obtained from respective sensors, and the like.

The backup RAM 114 is a non-volatile memory that stores data and the like that are to be preserved in turning off an ignition switch. More specifically, an over-rotation determination flag 114a, a resonance band residence determination flag 114b, and a charge prohibition flag 114c are stored in the backup RAM 114.

The over-rotation determination flag 114a is a flag for determining whether or not over-rotation of the pinion gear 2P of the power split mechanism 2 occurs. The resonance band residence determination flag 114b is a flag for determining whether or not the rotational speed of the engine 1 resides in a resonance band. The charge prohibition flag 114c is a flag indicating whether or not a later-described battery module 131 is prohibited from being charged. Incidentally, the over-rotation determination flag 114a, the resonance band residence determination flag 114b, and the charge prohibition flag 114c will be described later in detail.

The input/output interface 115 has the functions of allowing detection results obtained from the respective sensors and the like to be input thereto, and outputting control signals and the like to respective units. For example, a vehicle speed sensor 21 that detects a vehicle speed of the hybrid vehicle 100, an accelerator pedal position sensor 22 that detects a depression amount of an accelerator pedal, a crank position sensor 23 that detects rotation of the crankshaft 1a, a resolver 24 that detects rotation of the rotor MG1R of the generator MG1, a resolver 25 that detects rotation of the rotor MG2R of the motor MG2, and a power switch 26 for booting and stopping the hybrid system are connected to the input/output interface 115. The communication interface 116 is provided to communicate with the respective ECU's (e.g., the engine ECU 12).

The HVECU 11 calculates a total output on the basis of detection results obtained from the vehicle speed sensor 21 and the accelerator pedal position sensor 22, and the like, and controls the engine 1, the generator MG1, and the motor MG2 such that the total output is output to the front wheels 9.

[Engine ECU]

The engine ECU 12 (see FIG. 1) includes the CPU, the ROM, the RAM, the backup RAM, the input/output interface, the communication interface, and the like. The engine ECU 12 performs various kinds of control for the engine 1, including intake air amount control, fuel injection amount control, ignition timing control, and the like, in accordance with an output request from the HVECU 11.

[HV Battery]

Figure 3:
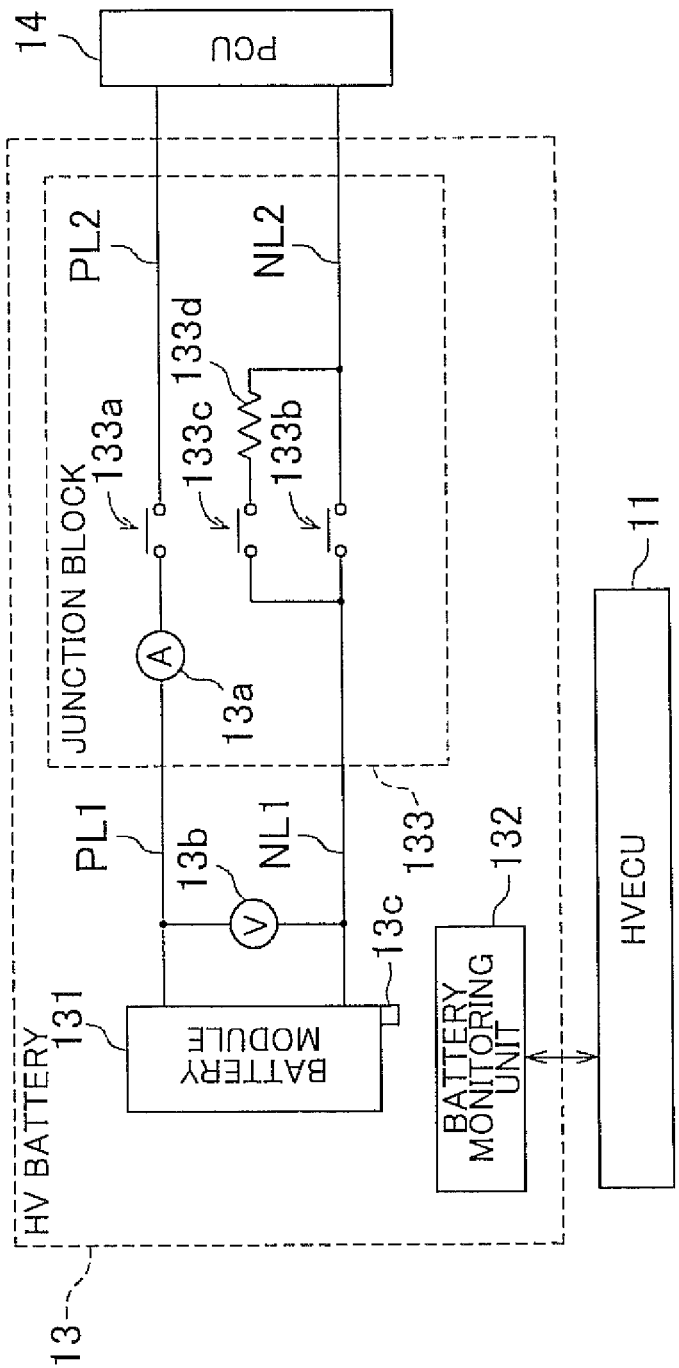
FIG. 3 is a block diagram showing an HV battery of the hybrid vehicle of FIG. 1.

As shown in FIG. 3, the HV battery 13 includes the battery module 131 as a high-voltage power supply for running, a battery monitoring unit 132 that monitors the battery module 131, and a junction block 133 in which electric components are accommodated.

The battery module 131 is configured to supply an electric power for driving the generator MG1 and the motor MG2, and store an electric power generated by the generator MG1 and the motor MG2. This battery module 131 is realized as, for example, a rechargeable nickel hydride battery or a rechargeable lithium-ion battery. The battery module 131 is connected to the PCU 14 via the junction block 133.

Incidentally, the battery module 131 is an example of "the electric storage device" of the invention.

A current sensor 13a that detects a charge/discharge current of the battery module 131, a voltage sensor 13b that detects a voltage of the battery module 131, and a temperature sensor 13c that detects a temperature of the battery module 131 (a battery temperature) are connected to the battery monitoring unit 132. In addition, the battery monitoring unit 132 sends pieces of information on the battery module 131 (the charge/discharge current, the voltage, and the battery temperature) to the HVECU 11. Thus, for example, the HVECU 11 calculates a state of charge (an SOC) of the battery module 131 on the basis of an integrated value of the charge/discharge current, and calculates an input limit Win and an output limit Wout on the basis of the SOC and the battery temperature.

The junction block 133 includes system main relays 133a to 133c.

The system main relays 133a to 133c are provided between the battery module 131 and the PCU 14 to connect the battery module 131 and the PCU 14 to each other or disconnect the battery module 131 and the PCU 14 from each other. The on/off states of the system main relays 133a to 133c are changed on the basis of a control signal from the HVECU 11.

More specifically, the system main relay 133a connects power supply lines PL1 and PL2 to each other when in an on state, and disconnects the power supply lines PL1 and PL2 from each other when in an off state. The system main relay 133b connects grounding lines NL1 and NL2 to each other when in an on state, and disconnects the grounding lines NL1 and NL2 from each other when in an off state.

Incidentally, the system main relay 133c is provided to suppress the generation of a startup current (a rush current). A resistor 133d is connected in series to the system main relay 133c. The system main relay 133c and the resistor 133d are connected in parallel to the system main relay 133b. In addition, when the battery module 131 is connected to the PCU 14, after the system main relays 133a and 133c are turned on, the system main relay 133b is turned on, and then the system main relay 133c is turned off.

That is, if the system main relays 133a and 133b are in an on state, the electric power of the battery module 131 can be supplied to the PCU 14, and the battery module 131 can be charged by the electric power supplied from the PCU 14. Besides, if the system main relays 133a to 133c are in an off state, the battery module 131 can be electrically separated from the PCU 14.

[Power Control Unit (PCU)]

Figure 4:
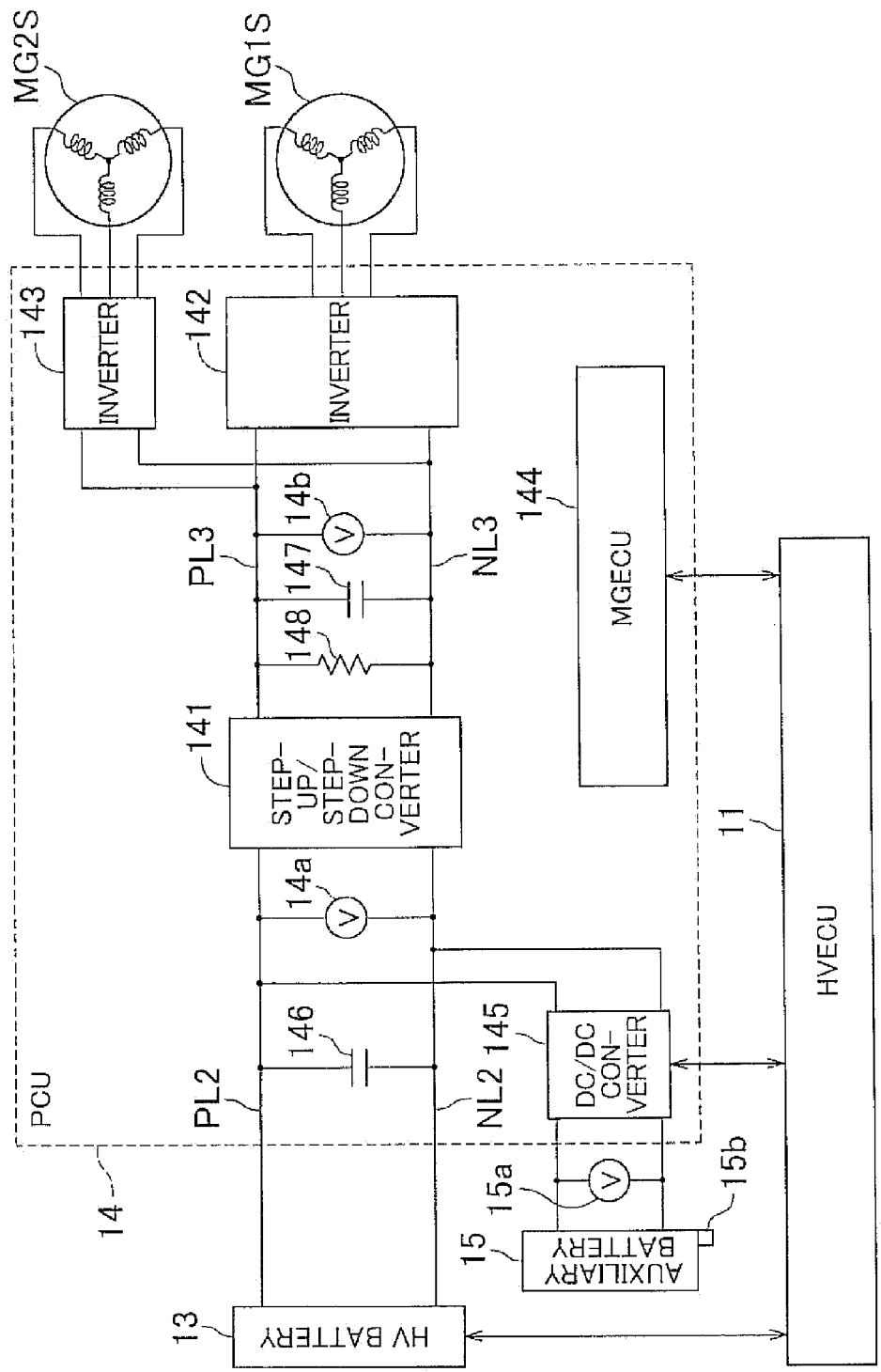
FIG. 4 is a block diagram showing a PCU of the hybrid vehicle of FIG. 1.

As shown in FIG. 4, the PCU 14 includes a step-up/step-down converter 141, inverters 142 and 143, an MGECU 144, and a DC/DC converter 145.

The step-up/step-down converter 141 is provided to step up a direct-current voltage of the HV battery 13 and supply the inverters 142 and 143 with the stepped-up direct-current voltage. Besides, the step-up/step-down converter 141 also has the functions of stepping down a voltage generated by the generator MG1 and converted into a direct-current voltage by the inverter 142 to supply the HV battery 13 with the stepped-down voltage, and stepping down a voltage generated by the motor MG2 and converted into a direct-current voltage by the inverter 143 to supply the HV battery 13 with the stepped-down voltage.

More specifically, the step-up/step-down converter 141 is configured to be capable of stepping up a voltage VL between the grounding line NL2 and the power supply line PL2 and outputting the stepped-up voltage VL to a region between the grounding line NL3 and the power supply line PL3. Besides, the step-up/step-down converter 141 is configured to be capable of stepping down a voltage VH between the grounding line NL3 and the power supply line PL3 and outputting the stepped-down voltage to a region between the grounding line NL2 and the power supply line PL2.

This step-up/step-down converter 141 is realized as, for example, a chopper-type step-up/step-down converter, and has a reactor, an insulated gate bipolar transistor (an IGBT), and a diode. In addition, the on/off state of the IGBT is controlled through a drive signal supplied from the MGECU 144, and the step-up/step-down converter 141 thereby steps up or steps down a voltage.

The inverter 142 converts an alternating current generated by the generator MG1 through a power of the engine 1 into a direct current, and outputs the direct current to a region between the grounding line NL3 and the power supply line PL3 (regenerative control). Besides, the inverter 142 converts a direct current supplied from the step-up/step-down converter 141 into an alternating current to drive the generator MG1 (power running control). The inverter 143 converts a direct current supplied from the step-up/step-down converter 141 into an alternating current to drive the motor MG2 (power running control). Besides, the inverter 143 converts an alternating current generated by the motor MG2 during regenerative braking into a direct current, and outputs the direct current to a region between the grounding line NL3 and the power supply line PL3 (regenerative control).

Figure 5:
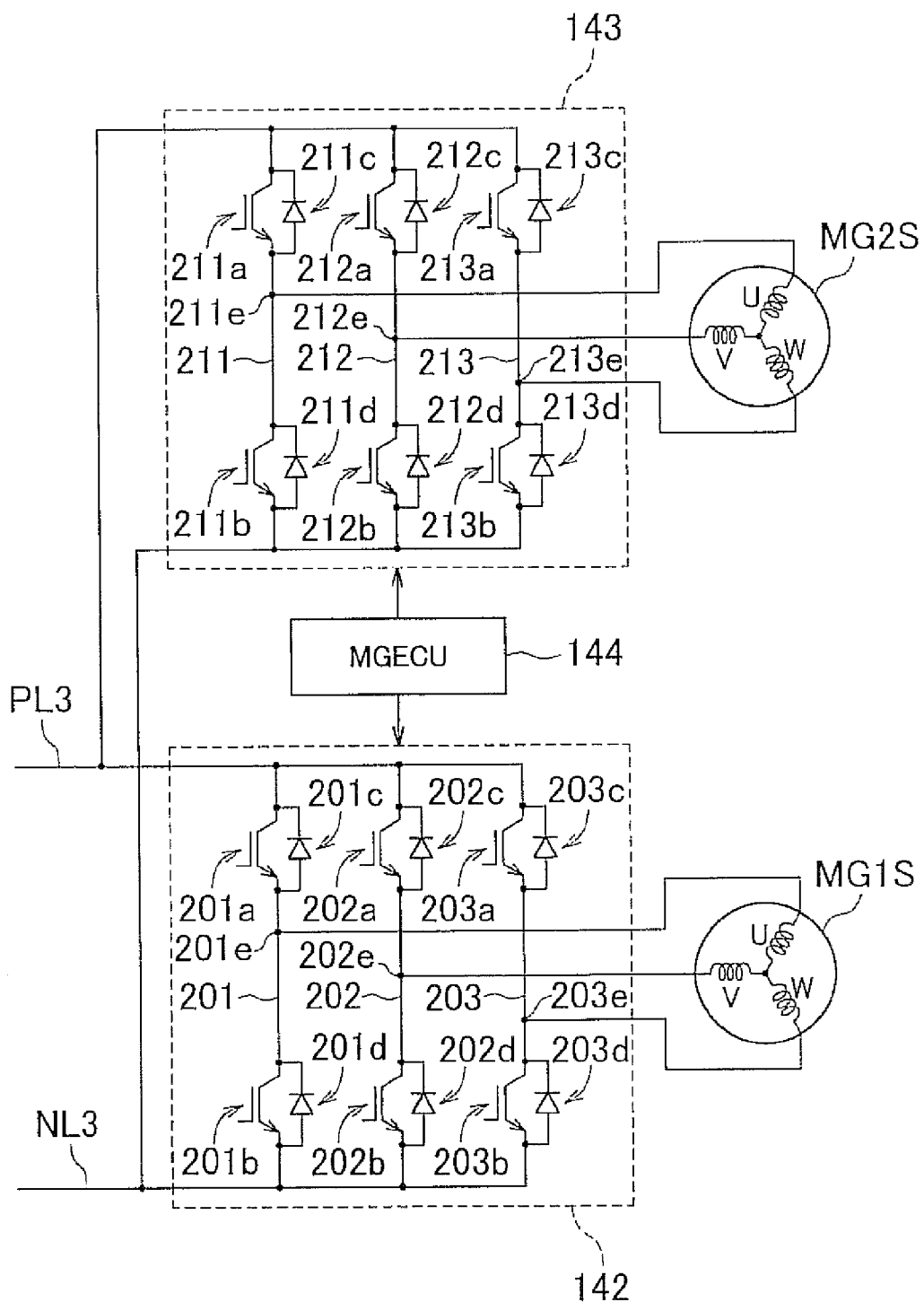
FIG. 5 is a circuit diagram showing an inverter of the PCU of the hybrid vehicle of FIG. 1.

More specifically, the inverter 142 is a three-phase bridge circuit as shown in, for example, FIG. 5, and has a U-phase arm 201, a V-phase arm 202, and a W-phase arm 203. The U-phase arm 201, the V-phase arm 202, and the W-phase arm 203 are connected in parallel between the grounding line NL3 and the power supply line PL3.

The U-phase arm 201 has an IGBT 201a and a diode 201c, which are provided on an upper arm thereof, and an IGBT 201b and a diode 201d, which are provided on a lower arm thereof. The V-phase arm 202 has an IGBT 202a and a diode 202c, which are provided on an upper arm thereof, and an IGBT 202h and a diode 202d, which are provided on a lower arm thereof. The W-phase arm 203 has an IGBT 203a and a diode 203c, which are provided on an upper arm thereof, and an IGBT 203b and a diode 203d, which are provided on a lower arm thereof.

Incidentally, each of the IGBT's 201a, 202a, and 203a is an example of "the first switching element" of the invention, and each of the IGBT's 201b, 202b, and 203b is an example of "the second switching element" of the invention. Besides, each of the diodes 201c, 202c, and 203c is an example of "the first rectifying element" of the invention, and each of the diodes 201d, 202d, and 203d is an example of "the second rectifying element" of the invention.

A drive signal (a PWM signal) that is output from the MGECU 144 is input to a gate of each of the IGBT's 201a, 201b, 202a, 202b, 203a, and 203b, and the on/off state of each of these IGBT's is controlled in accordance with the drive signal.

In each of the IGBT's 201a, 202a, and 203a, a collector is connected to the power supply line PL3, and an emitter is connected to a corresponding one of intermediate points 201e, 202e, and 203e of the respective phase arms. Besides, in each of the IGBT's 201b, 202b, and 203b, a collector is connected to a corresponding one of intermediate points 201e, 202e, and 203e of the respective phase arms, and an emitter is connected to the grounding line NL3.

In each of the diodes 201c, 202c, and 203c, a cathode is connected to the power supply line PL3, and an anode is connected to a corresponding one of the intermediate points 201e, 202e, or 203e of the respective phase arms. That is, the diodes 201c, 202c, and 203c are provided in parallel with the IGBT's 201a, 202a, and 203a respectively.

Besides, in each of the diodes 201d, 202d, and 203d, a cathode is connected to a corresponding one of the intermediate points 201e, 202e, and 203e of the respective phase arms, and an anode is connected to the grounding line NL3. That is, the diodes 201d, 202d, and 203d are provided in parallel with the IGBT's 201b, 202b, and 203b respectively.

Besides, each of the intermediate points 201e, 202e, and 203e of the respective phase arms is connected to one end of a corresponding one of respective phase coils of the stator MG1S of the generator MG1. Incidentally, the other end of each of the respective phase coils is connected to a neutral point.

By the same token, the inverter 143 is a three-phase bridge circuit, and includes a U-phase arm 211, a V-phase arm 212, and a W-phase arm 213. The U-phase arm 211, the V-phase arm 212, and the W-phase arm 213 are connected in parallel between the grounding line NL3 and the power supply line PL3.

The U-phase arm 211 has an IGBT 211*a* and a diode 211*c*, which are provided on an upper arm thereof, and an IGBT 211*b* and a diode 211*d*, which are provided on a lower arm thereof. The V-phase min 212 has an IGBT 212*a* and a diode 212*c*, which are provided on an upper arm thereof, and an IGBT 212*b* and a diode 212*d*, which are provided on a lower arm thereof. The W-phase arm 213 has an IGBT 213*a* and a diode 213*c*, which are provided on an upper arm thereof, and an IGBT 213*b* and a diode 213*d*, which are provided on a lower arm thereof.

Each of intermediate points 211*e*, 212*e*, and 213*e* of the U-phase arm 211, the V-phase arm 212, and the W-phase arm 213 is connected to one end of a corresponding one of respective phase coils of the stator MG2S of the motor MG2. Incidentally, the U-phase arm 211, the V-phase arm 212, and the W-phase arm 213 are identical in other configurational details to the aforementioned U-phase arm 201, the aforementioned V-phase arm 202, and the aforementioned W-phase arm 203.

The MGECU 144 shown in FIG. 4 includes a CPU, a ROM, a RAM, a backup RAM, an input/output interface, a communication interface, and the like. The MGECU 144 receives an output request sent from the HVECU 11, generates drive signals for the step-up/step-down converter 141 and the inverters 142 and 143 on the basis of the output request or the like, and Outputs the drive signals to the step-up/step-down converter 141 and the inverters 142 and 143 respectively.

The DC/DC converter 145 is provided to step down the voltage VL between the grounding line NL2 and the power supply line PL2 and charge the auxiliary battery 15. Besides, the DC/DC converter 145 has the function of supplying the stepped-down voltage to auxiliaries (e.g., a lamp and the like) and the respective ECU's (e.g., the HVECU 11 and the like). This DC/DC converter 145 is driven in accordance with a request from the HVECU 11.

The auxiliary battery 15 is realized as, for example, a rechargeable lead storage battery, and functions as a source of supply of an electric power for driving the auxiliaries and the respective ECU's. Incidentally, a voltage sensor 15*a* that detects a voltage of the auxiliary battery 15, and a temperature sensor 15*b* that detects a temperature of the auxiliary battery 15 are connected to the HVECU 11.

Besides, the PCU 14 is provided, between the power supply line PL2 and the grounding line NL2, with a capacitor 146 for smoothing voltage fluctuations, and is provided, between the power supply line PL3 and the grounding line NL3, with a capacitor 147 for smoothing voltage fluctuations. A resistor 148 for dropping the voltage of the power supply line PL3 after the stoppage of the hybrid system is provided between the power supply line PL3 and the grounding line NL3.

Besides, the PCU 14 is provided with a voltage sensor 14*a* that detects a voltage VL between the power supply line PL2 and the grounding line NL2, and a voltage sensor 14*b* that detects the voltage VH between the power supply line PL3 and the grounding line NL3. Detection results obtained from the voltage sensors 14*a* and 14*b* are output to the HVECU 11.

—Running State—

Next, an example of running state of the hybrid vehicle 100 in accordance with one embodiment of the invention will be described.

For example, during the start of running, running at low vehicle speed and with light load, or the like, the hybrid vehicle 100 stops the operation of the engine 1, and performs power running control of the motor MG2 so as to run (EV running).

Besides, during steady running or the like, the hybrid vehicle 100 runs with the engine 1 serving as a main power source, performs regenerative control of the generator MG1, and supplementarily performs power running control of the motor MG2 by the electric energy obtained through the regenerative control.

Besides, during acceleration or the like, the hybrid vehicle 100 drives the engine 1, and performs power running control of the motor MG2 by the electric energy obtained through regenerative control of the generator MG1 and the electric energy of the HV battery 13, so as to run.

Besides, during deceleration (when the accelerator is off) or the like, the hybrid vehicle 100 performs regenerative control of the motor MG2 to apply a braking torque, and recovers energy to charge the HV battery 13.

Besides, during backward movement, the hybrid vehicle 100 performs power running control of the motor MG2 in a rotational direction reverse to a rotational direction during forward movement.

—Processing of Stopping Hybrid System during Running—

Next, a processing of stopping the hybrid system during running of the hybrid vehicle 100 in accordance with one embodiment of the invention will be described with reference to FIGS. 7 to 11. Incidentally, the respective steps shown below are executed by the CPU 111 (see FIG. 6) of the HVECU 11.

Figure 7:
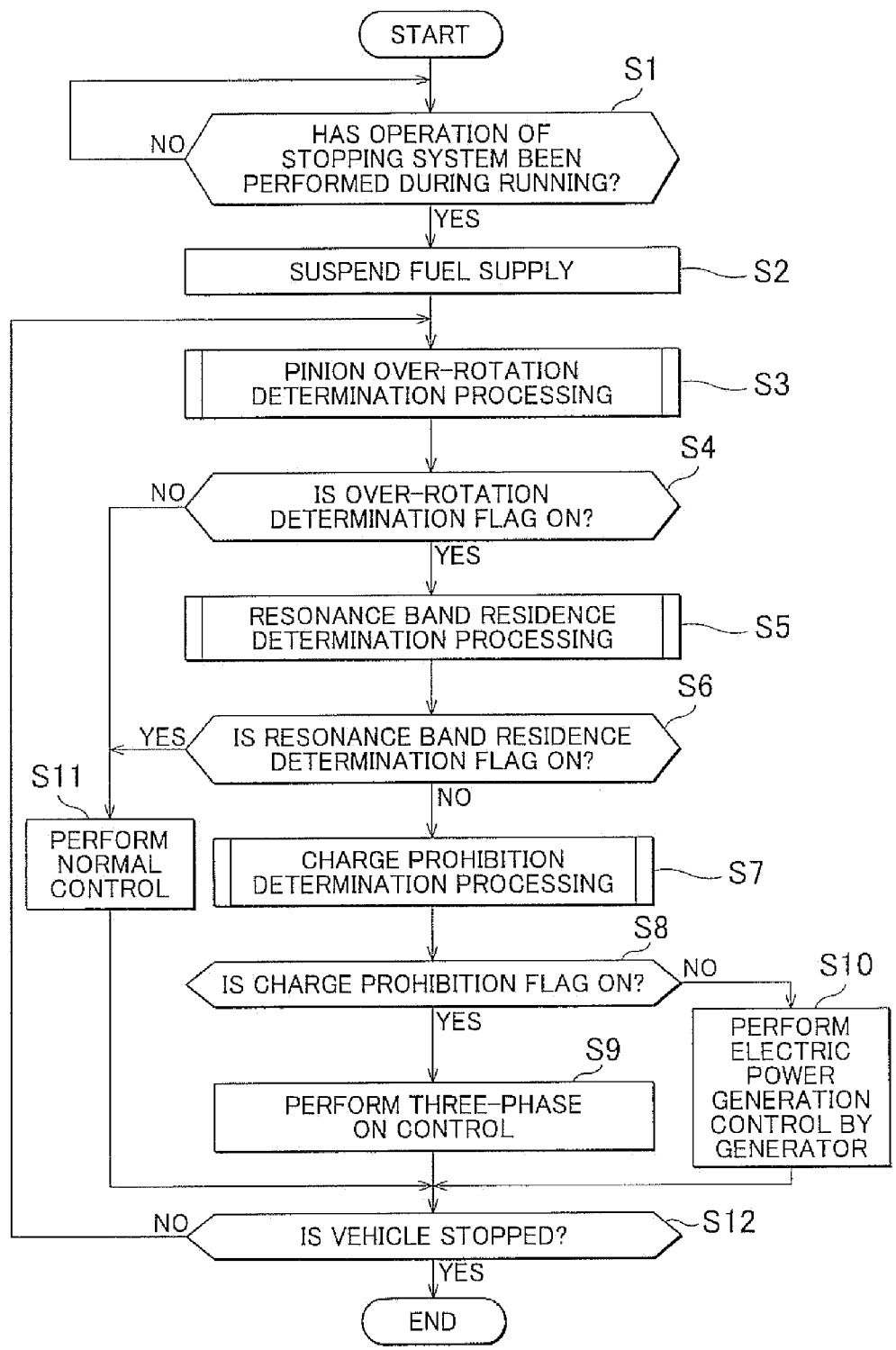
FIG. 7 is a flowchart for illustrating a processing of stopping a hybrid system during the running of the hybrid vehicle of FIG. 1.

First of all, in step S1 of FIG. 7, it is determined whether or not an operation of stopping the hybrid system has been performed during running. More specifically, it is determined on the basis of a detection result obtained from the vehicle speed sensor 21 whether or not the hybrid vehicle 100 is running, and it is determined on the basis of a signal from the power switch 26 whether or not the operation of stopping the hybrid system has been performed. Then, if it is determined that the operation of stopping the hybrid system has been performed during running, an indicator lamp (Ready-On) indicating that the hybrid system is being booted is extinguished, and a transition to step S2 is made. On the other hand, if it is determined that the operation of stopping the hybrid system has not been performed during running, step S1 is repeatedly executed. That is, the hybrid vehicle 100 stands by until the operation of stopping the hybrid system 100 is performed during running.

Figure 11:
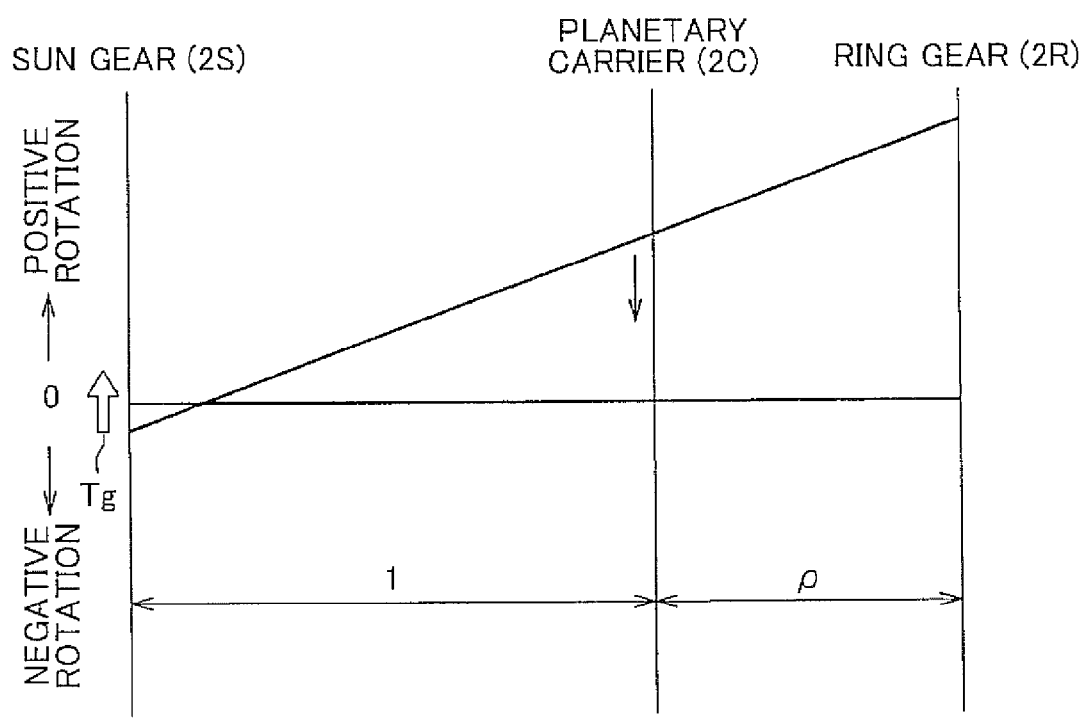
FIG. 11 is a collinear diagram for illustrating an operation of the power split mechanism at the time of the processing of stopping the hybrid system during the running of the hybrid vehicle of FIG. 1.

Subsequently in step S2, the operation of the engine 1 (see FIG. 1) is stopped through the cut off of fuel supply or the like. It should be noted herein that if the operation of the engine 1 is stopped, a rotational speed Ne of the engine 1 (the crankshaft 1*a*) decreases to become equal to zero, and the rotational speed Nc of the planetary carrier 2C of the power split mechanism 2 thereby decreases. For example, if the operation of the engine 1 of the hybrid vehicle 100 in the running state shown in FIG. 2 is stopped, a rotational speed Nc of the planetary carrier 2C decreases as shown in FIG. 11, and a rotational speed Ns of the sun gear 2S thereby decreases to shift from a positive rotation range to a negative rotation range.

Subsequently in step S3, an over-rotation determination processing for the pinion gear 2P of the power split mechanism 2 is performed. This over-rotation determination processing is a processing for setting on/off (updating) an over-rotation determination flag 114*a* (see FIG. 6) that is stored in the backup RAM 114.

Figure 8:
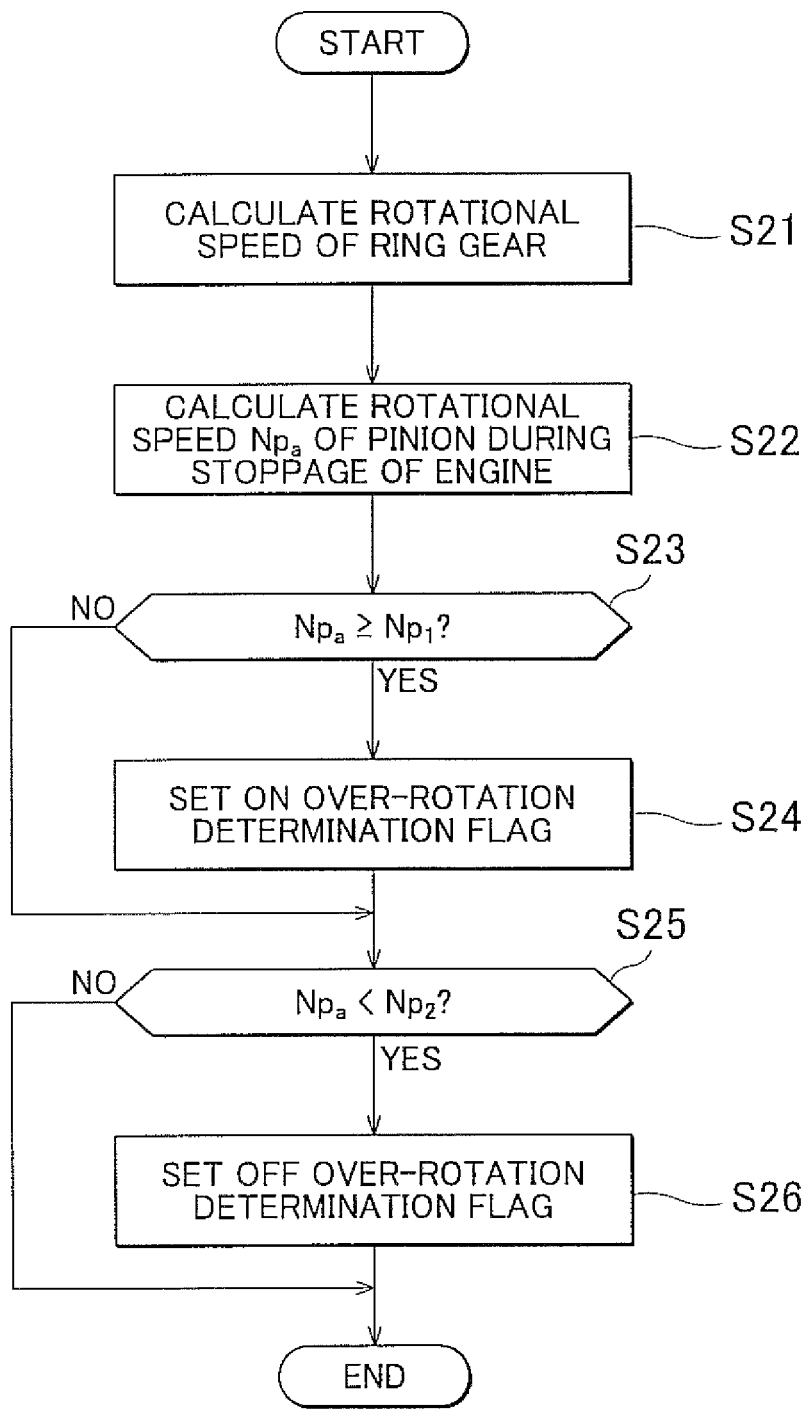
FIG. 8 is a flowchart for illustrating a pinion over-rotation determination processing of FIG. 7.

In this .over-rotation determination processing, first of all in step S21 of FIG. 8, a current rotational speed Nr of the ring gear 2R is calculated. This rotational speed Nr of the ring gear 2R is calculated using, for example, a rotational speed Nm of the motor MG2, which is calculated on the basis of a detection result obtained from the resolver 25. Incidentally, the rotational speed Nr of the ring gear 2R may be calculated on the basis of a vehicle speed of the hybrid vehicle 100 (a detection result obtained from the vehicle speed sensor 21).

Subsequently in step S22, an estimated rotational speed Npa of the pinion gear 2P during the stoppage of rotation of the engine 1 is calculated.

It should be noted herein that the rotational speed Np of the pinion gear 2P is proportional to the difference between the rotational speed Nr of the ring gear 2R and the rotational speed No of the planetary carrier 2C, and that the rotational speed Nc of the planetary carrier 2C is equal to zero during the stoppage of rotation of the engine 1. Therefore, the estimated rotational speed Npa of the pinion gear 2P is obtained according to an equation shown below, using the rotational speed Nr of the ring gear 2R that is calculated in step S21.

$$Npa = Nr - (-Nr/\rho)$$

Then in step S23, it is determined whether or not the estimated rotational speed Npa of the pinion gear 2P is equal to or higher than a first threshold $Np_1$. This first threshold $Np_1$ is a preset value (a preset rotational speed) that is equal to, for example, 10000 rpm. Then, if it is determined that the estimated rotational speed Npa is equal to or higher than the first threshold $Np_1$, the over-rotation determination flag 114a is set on in step S24, and a transition to step S25 is made. On the other hand, if it is determined that the estimated rotational speed Npa is not equal to or higher than the first threshold $Np_1$ (that the estimated rotational speed Npa is lower than the first threshold $Np_1$), a transition to step S25 is made.

Subsequently in step S25, it is determined whether or not the estimated rotational speed Npa of the pinion gear 2P is lower than a second threshold $Np_2$. This second threshold $Np_2$ is a preset value (a preset rotational speed) that is equal to, for example, 8000 rpm. Then, if it is determined that the estimated rotational speed Npa is lower than the second threshold $Np_2$, the over-rotation determination flag 114a is set off in step S26. Thus, the over-rotation determination processing for the pinion gear 2P is ended, and a transition to step S4 of FIG. 7 is thereby made. On the other hand, if it is determined that the estimated rotational speed Npa is not lower than the second threshold $Np_2$ (that the estimated rotational speed Npa is equal to or higher than the second threshold $Np_2$), the over-rotation determination processing for the pinion gear 2P is ended, and a transition to step S4 of FIG. 7 is thereby made.

That is, in the over-rotation determination processing for the pinion gear 2P in step S3, if the estimated rotational speed Npa of the pinion gear 2P is equal to or higher than the first threshold $Np_1$, the over-rotation determination flag 114a is set on, and if the estimated rotational speed Npa of the pinion gear 2P is lower than the second threshold $Np_2$, the over-rotation determination flag 114a is set off. Incidentally, if the estimated rotational speed Npa of the pinion gear 2P is equal to or higher than the second threshold $Np_2$ and lower than the first threshold $Np_1$, the over-rotation determination flag 114a is not updated, and the state prior to the start of the over-rotation determination processing is continued.

Subsequently in step S4, it is determined whether or not the over-rotation determination flag 114a stored in the backup RAM 114 is on. Then, if it is determined that the over-rotation determination flag 114a is on, over-rotation of the pinion gear 2P may occur, and hence a transition to step S5 is made. On the other hand, if it is determined that the over-rotation determination flag 114a is off, over-rotation of the pinion gear 2P does not occur, and hence a transition to step S11 is made.

Subsequently in step S5, a resonance band residence determination processing is performed. This resonance band residence determination processing is a processing for setting on/off (updating) a resonance band residence determination flag 114b stored in the backup RAM 114.

Figure 9:
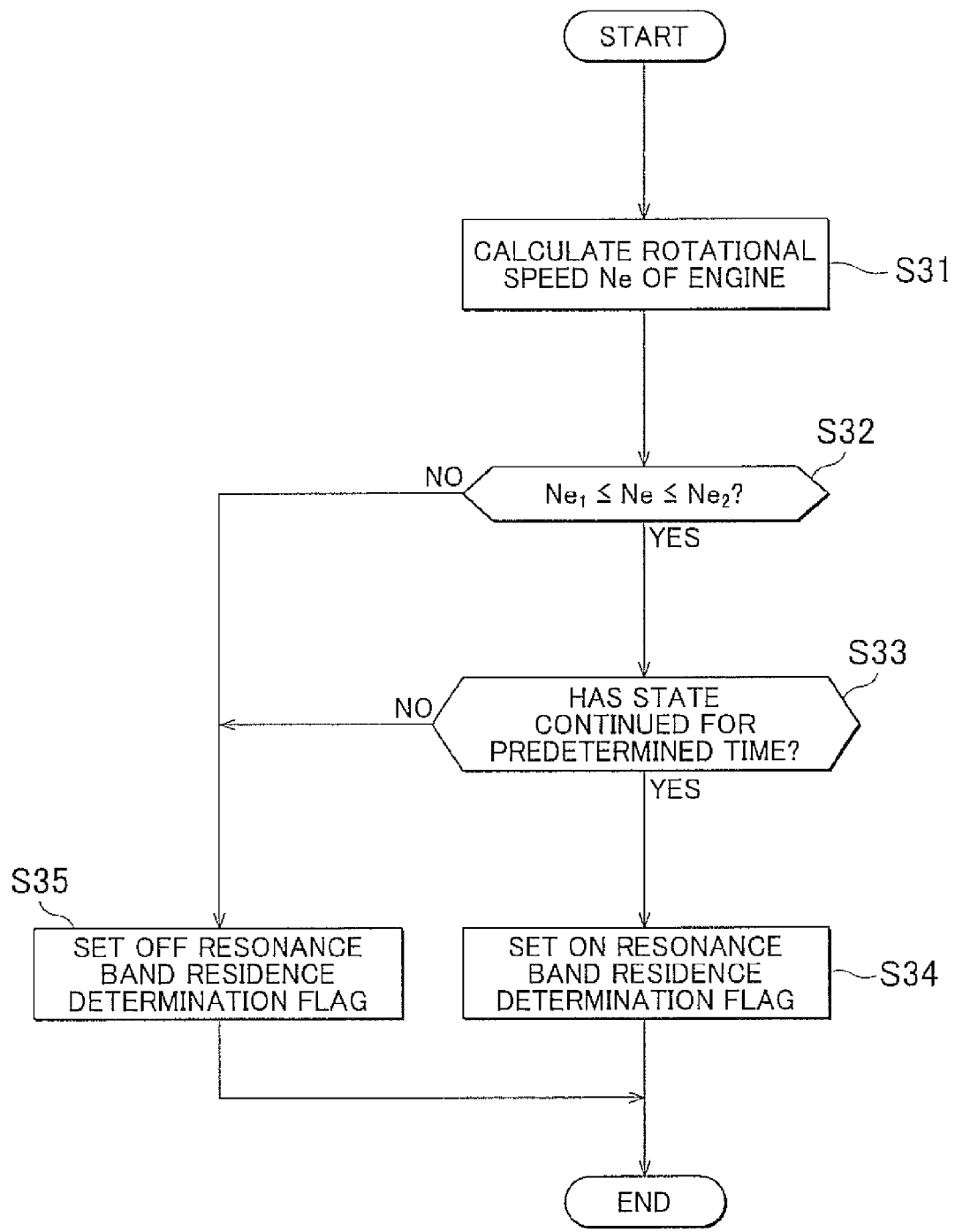
FIG. 9 is a flowchart for illustrating a resonance band residence determination processing of FIG. 7.

In this resonance band residence determination processing, first of all in step S31 of FIG. 9, the rotational speed Ne of the engine 1 is calculated on the basis of a detection result obtained from the crank position sensor 23.

Subsequently in step S32, it is determined whether or not the rotational speed Ne of the engine 1 is equal to or higher than a first threshold $Ne_1$ and equal to or lower than a second threshold $Ne_2$. Incidentally, the first threshold $Ne_1$ and the second threshold $Ne_2$ are preset values (preset rotational speeds). For example, the first threshold $Ne_1$ is equal to 200 rpm, and the second threshold $Ne_2$ is equal to 500 rpm. Then, if it is determined that the rotational speed Ne of the engine 1 is equal to or higher than the first threshold $Ne_1$ and equal to or lower than the second threshold $Ne_2$, a transition to step S33 is made. On the other hand, if it is determined that the rotational speed Ne of the engine 1 is lower than the first threshold $Ne_1$, or if it is determined that the rotational speed Ne of the engine 1 is higher than the second threshold $Ne_2$, the resonance band residence determination flag 114b is set off in step S35. Thus, the resonance band residence determination processing is ended, and a transition to step S6 of FIG. 7 is thereby made.

Subsequently in step S33, it is determined whether or not a state in which the rotational speed Ne of the engine 1 is equal to or higher than the first threshold $Ne_1$ and equal to or lower than the second threshold $Ne_2$ has continued for a predetermined time. This predetermined time is a preset time that is equal to, for example, 5 seconds. Then, if it is determined that the state has continued for the predetermined time, the resonance band residence determination flag 114b is set on in step S34. Thus, the resonance band residence determination processing is ended, and a transition to step S6 of FIG. 7 is thereby made. On the other hand, if it is determined that the state has not continued for the predetermined time, the resonance band residence determination flag 114b is set off in step S35. Thus, the resonance band residence determination processing is ended, and a transition to step S6 of FIG. 7 is thereby made.

Subsequently in step S6, it is determined whether or not the resonance band residence determination flag 114b stored in the backup RAM 114 is on. Then, if it is determined that the resonance band residence determination flag 114b is on, the rotational speed Ne of the engine 1 resides in a resonance band, and hence a transition to step S11 is made. On the other hand, if it is determined that the resonance band residence determination flag 114b is off, the rotational speed Ne of the engine 1 does not reside in the resonance band, and hence a transition to step S7 is made.

Subsequently in step S7, a charge prohibition determination processing is performed. This charge prohibition determination processing is a processing for setting on/off (updating) a charge prohibition flag 114c stored in the backup RAM 114.

Figure 10:
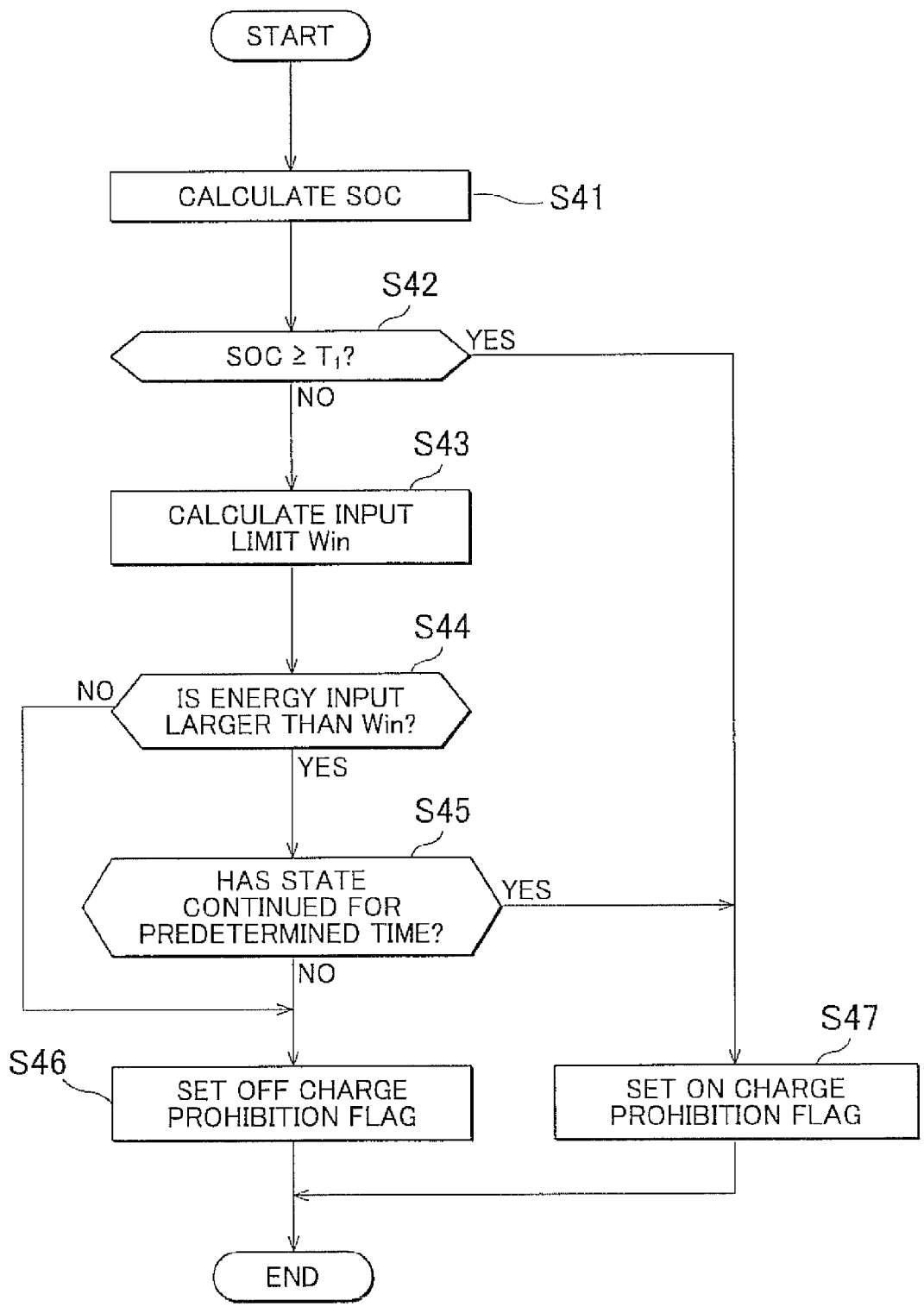
FIG. 10 is a flowchart for illustrating a charge prohibition determination processing of FIG. 7.

In this charge prohibition determination processing, first of all in step S41 of FIG. 10, an SOC of the battery module 131 (see FIG. 3) is calculated. The SOC is calculated on the basis of, for example, an integrated value of a charge/discharge current that is detected by the current sensor 13a.

Subsequently in step S42, it is determined whether or not the SOC of the battery module 131 is equal to or larger than a threshold $T_1$. This threshold $T_1$ is a preset value that is equal to, for example, 80%. Then, if it is determined that the SOC is equal to or larger than the threshold $T_1$, the charge prohibition flag 114c is set on in step S47. Thus, the charge prohibition determination processing is ended, and a transition to step S8 of FIG. 7 is thereby made. On the other hand, if it is determined that the SOC is not equal to or larger than the threshold $T_1$ (that the SOC is smaller than the threshold $T_1$), a transition to step S43 is made.

Subsequently in step S43, an input limit Win of the battery module 131 is calculated. The input limit Win is calculated on the basis of for example, an SOC and a battery temperature that is detected by the temperature sensor 13c.

Subsequently in step S44, it is determined whether or not an energy input to the battery module 131 is larger than the input limit Win. Incidentally, the energy input to the battery module 131 is calculated by multiplying a current detected by the current sensor 13a by a voltage detected by the voltage sensor 13b. It should be noted herein that in the case where the charge direction of the current is negative, if the input energy is smaller than the input limit Win, it is determined that the input energy is larger than the input limit Win. Then, if it is determined that the input energy is larger than the input limit Win, a transition to step S45 is made. On the other hand, if it is determined that the input energy is not larger than the input limit Win, a charge prohibition flag 114c is set off in step S46. Thus, the charge prohibition determination processing is ended, and a transition to step S8 of FIG. 7 is thereby made.

Subsequently in step S45, it is determined whether or not a state in which the input energy is larger than the input limit Win has continued for a predetermined time. This predetermined time is a preset time that is equal to, for example, 3 seconds. Then, if it is determined that the state has continued for the predetermined time, the charge prohibition flag 114c is set on in step S47. Thus, the charge prohibition determination processing is ended, and a transition to step S8 of FIG. 7 is thereby made. On the other hand, if it is determined that the state has not continued for the predetermined time, the charge prohibition flag 114c is set off in step S46. Thus, the charge prohibition determination processing is ended, and a transition to step S8 of FIG. 7 is thereby made.

Subsequently in step S8, it is determined whether or not the charge prohibition flag 114c stored in the backup RAM 114 is on. Then, if it is determined that the charge prohibition flag 114c is on, the battery module 131 is prohibited from being charged, and hence a transition to step S9 is made. On the other hand, if it is determined that the charge prohibition flag 114c is off, the battery module 131 is allowed to be charged, and hence a transition to step S10 is made.

Then, if the over-rotation determination flag 114a is on, the resonance band residence determination flag 114b is off, and the charge prohibition flag 114c is on, an inverter 142 (see FIG. 5) that controls the generator MG1 is subjected to three-phase on control in step S9. Incidentally, this three-phase on control is performed for a preset time, and a transition to step S12 is made.

It should be noted herein that three-phase on control means the turning on of the IGBT's 201b, 202b, and 203b on the lower arms of the respective phase arms 201 to 203, and the turning off of the IGBT's 201a, 202a, and 203a on the upper arms of the respective phase arms 201 to 203.

Then, three-phase on control is performed, and the sun gear 2S (the generator MG1) is thereby rotated in accordance with the planetary carrier 2C (the engine 1) that is rotated by inertia, so that a back electromotive force that is generated in the generator MG1 is refluxed on the lower arms of the respective phase arms 201 to 203. Thus, a torque is generated in such a direction as to reduce the rotational speed Ns of the sun gear 2S. Therefore, as shown in FIG. 11, if the sun gear 2S is in a negative rotation range, a torque Tg is generated in such a direction as to raise the rotational speed Ne of the engine 1.

Besides, if the over-rotation determination flag 114a is on, the resonance band residence determination flag 114b is off, and the charge prohibition flag 114c is off, electric power generation control is performed by the generator MG1 in step S10. Incidentally, this electric power generation control is performed for a preset time, and a transition to step S12 is made.

More specifically, in this electric power generation control, the step-up/step-down converter 141 (see FIG. 4) is controlled such that the voltage VH between the grounding line NL3 and the power supply line PL3 becomes lower than a back electromotive voltage Vg that is generated in the generator MG1 due to the rotation of the sun gear 2S in accordance with the rotation of the planetary carrier 2C by inertia, and the inverter 142 is caused to function as a full-wave rectifier circuit by shutting off the gate of the inverter 142. Incidentally, the voltage VH is detected by the voltage sensor 14b, and the back electromotive voltage Vg is calculated on the basis of the rotational speed of the generator MG1 that is detected by the resolver 24. Besides, the shutoff of the gate of the inverter 142 means the turning off of all the IGBT's (the IGBT's 201a, 201b, 202a, 202b, 203a, and 203b) of the inverter 142.

Thus, the electric power generated by the generator MG1 is rectified by the inverter 142 to charge the battery module 131, and a torque is generated in such a direction as to reduce the rotational speed Ns of the sun gear 2S, as is the case with three-phase on control. Therefore, as shown in FIG. 11, if the sun gear 2S is in a negative rotation range, the torque Tg is generated in such a direction as to raise the rotational speed Ne of the engine 1.

Besides, if the over-rotation determination flag 114a is off and the resonance band residence determination flag 114b is on, normal control is performed in step S11. Incidentally, this normal control is performed for a preset time, and a transition to step S12 is made.

It should be noted herein that normal control means performing control such that the torque output from the generator MG1 becomes equal to zero. More specifically, if the voltage VH between the grounding line NL3 and the power supply line PL3 is higher than the back electromotive voltage Vg that is generated in the generator MG1 due to the rotation of the sun gear 2S in accordance with the rotation of the planetary carrier 2C by inertia, the gate of the inverter 142 is shut off. Besides, if the voltage VH is lower than the back electromotive voltage Vg, drive control (weak field control) of the inverter 142 is performed such that the torque output from the generator MG1 becomes equal to zero.

After that, in step S12, it is determined, on the basis of a detection result obtained from the vehicle speed sensor 21, whether or not coasting of the hybrid vehicle 100 has been stopped. Then, if it is determined that coasting of the hybrid vehicle 100 has been stopped, a drop in the voltage VH is confirmed, the ignition switch is turned off, and a processing of stopping the hybrid system during running is ended. On the other hand, if it is determined that coasting of the hybrid vehicle 100 has not been stopped, a return to step S3 is made.

—Effects—

In this embodiment of the invention, as described above, when over-rotation of the pinion gear 2P may occur, three-phase on control is performed to perform the operation of stopping the hybrid system during the running of the hybrid vehicle 100. In the case where the operation of the engine 1 is thereby stopped, the back electromotive force that is generated by the generator MG1 due to the rotation of the sun gear 2S (the generator MG1) in accordance with the rotation of the planetary carrier 2C (the engine 1) by inertia can be refluxed on the lower arms of the inverter 142. Thus, if the sun gear 2S is in a negative rotation range, a torque applied in such a direction as to maintain the rotation of the planetary carrier 2C (a torque that raises the rotational speed Ne of the engine 1) can be output from the generator MG1. Thus, the difference between the rotational speed Nr of the ring gear 2R and the rotational speed Nc of the planetary carrier 2C can be restrained from increasing. Therefore, over-rotation of the pinion gear 2P can be restrained from occurring. Accordingly, the components of the power split mechanism 2 can be protected.

In addition, if the engine 1 has been stopped from rotating when the hybrid system is rebooted after the operation of stopping the hybrid system is performed during running and before the hybrid vehicle 100 is stopped from coasting, the amount of electric power generation resulting from cranking increases, and cranking may become difficult. In this embodiment of the invention, the amount of electric power generation resulting from cranking can be reduced by raising the rotational speed Ne of the engine 1. Therefore, the engine 1 can be made easy to crank. That is, in the hybrid vehicle 100 in accordance with this embodiment of the invention, the engine 1 can be made easy to start in rebooting the hybrid system during running.

Besides, in this embodiment of the invention, if the over-rotation determination flag 114a is on and the charge prohibition flag 114c is off, electric power generation control is performed by the generator MG1. Thus, while the back electromotive force generated by the generator MG1 is rectified by the inverter 142 to charge the battery module 131, a torque applied in such a direction as to maintain the rotation of the planetary carrier 2C can be output from the generator MG1.

Besides, in this embodiment of the invention, if the resonance band residence determination flag 114b is on, normal control is performed. Thus, a torque is prevented from being output from the generator MG1 in the case where the rotational speed Ne of the engine 1 resides in the resonance band. Thus, the rotational speed Ne of the engine 1 can be made likely to leave the resonance band.

—Other Embodiments—

Incidentally, the embodiment of the invention disclosed herein is exemplary in all respects, and does not constitute any basis of limited interpretation. Accordingly, the technical scope of the invention is not interpreted only by the foregoing embodiment of the invention, but is defined on the basis of the description of the claims. Besides, the technical scope of the invention includes all modifications that are equivalent in significance and scope to the claims.

For example, in this embodiment of the invention, the example in which the invention is applied to the FF-type hybrid vehicle 100 is illustrated. However, the invention is not limited to this example. The invention may also be applied to an FR-type hybrid vehicle or a 4WD-type hybrid vehicle.

Besides, in this embodiment of the invention, the example in which the hybrid vehicle 100 is provided with the two motor generators (the generator MG1 and the motor MG2) is illustrated. However, the invention is not limited to this example. The hybrid vehicle may be provided with three or more motor generators. For example, the hybrid vehicle 100 in accordance with this embodiment of the invention may be provided with a motor generator that drives a rear-wheel axle as well as the generator MG1 and the motor MG2.

Besides, in this embodiment of the invention, the example in which three-phase on control or electric power generation control by the generator MG1 is performed if the over-rotation determination flag 114a is on is illustrated. However, the invention is not limited to this example. Three-phase on control or electric power generation control by the generator MG1 may be performed until a vehicle speed that allows the engine 1 to be cranked is reached, if the hybrid system is rebooted during coasting after the operation of stopping the hybrid system is performed during running.

Besides, in this embodiment of the invention, the example in which three-phase on control is performed if the charge prohibition flag 114c is on, and electric power generation control by the generator MG1 is performed if the charge prohibition flag 114c is off is illustrated. However, the invention is not limited to this example. The aforementioned steps S7 and S8 may be omitted, and three-phase on control may always be performed if the over-rotation determination flag 114a is on and the resonance band residence determination flag 114b is off. That is, electric power generation control by the generator MG1 may not be performed.

Besides, in this embodiment of the invention, three-phase on control and electric power generation control by the generator MG1 may be performed only if the sun gear 2S is in a negative rotation range. Three-phase on control and electric power generation control by the generator MG1 may not be performed if the sun gear 2S is in a positive rotation range.

Besides, in this embodiment of the invention, the example in which the IGBT's 201b, 202b, and 203b on the lower arms of the respective phase arms 201 to 203 are turned on, and the IGBT's 201a, 202a, and 203a on the upper arms of the respective phase arms 201 to 203 are turned off during three-phase on control of the inverter 142 is illustrated. However, the invention is not limited to this example. The IGBT's 201b, 202b, and 203b on the lower arms of the respective phase arms 201 to 203 may be turned off, and the IGBT's 201a, 202a, and 203a on the upper arms of the respective phase arms 201 to 203 may be turned on.

Besides, in this embodiment of the invention, the example in which the value of the first threshold $Np_1$ and the value of the second threshold $Np_2$ are different from each other in the over-rotation determination processing is illustrated. However, the invention is not limited to this example. The value of the first threshold $Np_1$ and the value of the second threshold $Np_2$ may be equal to each other in the over-rotation determination processing. That is, the over-rotation determination flag 114a may invariably be set on or off in the over-rotation determination processing.

Besides, in this embodiment of the invention, the example in which the over-rotation determination flag 114a, the resonance band residence determination flag 114b, and the charge prohibition flag 114c are stored in the backup RAM 114 is illustrated. However, the invention is not limited to this example. The over-rotation determination flag, the resonance band residence determination flag, and the charge prohibition flag may be stored in the RAM 113.

Besides, in this embodiment of the invention, the IGBT's are illustrated as an example of the first switching element and the second switching element. However, the invention is not limited to this example. Power MOSFET's may be employed as the first switching element and the second switching element.

Besides, the values of the thresholds mentioned in this embodiment of the invention are all exemplary, and the invention is not limited thereto.

What is claimed is:

1. A hybrid vehicle comprising:
an engine and an electric motor for driving a driving wheel;
an electric power generator capable of generating an electric power by a power of the engine;

a power split mechanism that splits the power of the engine and transmits the split power to the driving wheel and the electric power generator;

an inverter that is connected to the electric power generator and includes a plurality of arms; and a control device that controls running through execution of a vehicle system, wherein the power split mechanism includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine, and each of the arms of the inverter includes a first switching element that is provided on an upper arm thereof, and a second switching element that is provided on a lower arm thereof, and the control device turns on one of the first switching element and the second switching element and turns off the other if an operation of stopping the vehicle system is performed during running.

2. The hybrid vehicle according to claim 1, wherein the control device has an over-rotation determination flag for determining whether or not over-rotation of the pinion gear occurs, and turns on one of the first switching element and the second switching element and turns off the other if the over-rotation determination flag is on.

3. The hybrid vehicle according to claim 2, wherein the control device has a resonance band residence determination flag for determining whether or not a rotational speed of the engine resides in a resonance band, and turns on one of the first switching element and the second switching element and turns off the other if the over-rotation determination flag is on and the resonance band residence determination flag is off.

4. The hybrid vehicle according to claim 3, further comprising an electric storage device that stores an electric power for running, wherein the control device has a charge prohibition flag indicating whether or not the electric storage device is prohibited from being charged, and turns on one of the first switching element and the second switching element and turns off the other if the over-rotation determination flag is on, the resonance band residence determination flag is off, and the charge prohibition flag is on.

5. The hybrid vehicle according to claim 4, further comprising a step-up/step-down converter that is provided between the inverter and the electric storage device, wherein each of the arms of the inverter includes a first rectifying element that is provided in parallel with the first switching element, and a second rectifying element that is provided in parallel with the second switching element, and the control device turns off the first switching element and the second switching element and controls the step-up/step-down converter in such a manner as to charge the electric storage device by generating an electric power by the electric power generator if the over-rotation determination flag is on, the resonance band residence determination flag is off, and the charge prohibition flag is off.

6. A control method for a hybrid vehicle that is equipped with an engine and an electric motor for driving a driving wheel, an electric power generator capable of generating an electric power by a power of the engine, a power split mechanism that splits the power of the engine and transmits the split power to the driving wheel and the electric power generator, and includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine, and an inverter that is connected to the electric power generator and includes a plurality of arms each of which includes a first switching element provided on an upper arm thereof and a second switching element provided on a lower arm thereof, the method comprising:

turning on one of the first switching element and the second switching element and turning off the other if an operation of stopping a vehicle system is performed during running and the sun gear is in a negative rotation range.

7. A control method for a hybrid vehicle that is equipped with an engine and an electric motor for driving a driving wheel, an electric power generator capable of generating an electric power by a power of the engine, a power split mechanism that splits the power of the engine and transmits the split power to the driving wheel and the electric power generator, and includes a sun gear that is coupled to the electric power generator, a ring gear that is coupled to the electric motor and the driving wheel, a pinion gear that meshes with the sun gear and the ring gear, and a carrier that supports the pinion gear and is coupled to the engine, and an inverter that is connected to the electric power generator and includes a plurality of arms each of which includes a first switching element provided on an upper arm thereof and a second switching element provided on a lower arm thereof, each of the arms including a first rectifying element that is provided in parallel with the first switching element, and a second rectifying element that is provided in parallel with the second switching element, an electric storage device that stores an electric power for running, and a step-up/step-down converter that is provided between the inverter and the electric storage device, the method comprising:

turning off the first switching element and the second switching element and controlling the step-up/step-down converter in such a manner as to charge the electric storage device by generating an electric power by the electric power generator if an operation of stopping a vehicle system is performed during running and the sun gear is in a negative rotation range.

* * * * *